United States Patent [19]

Schreiner

[11] 4,393,952
[45] Jul. 19, 1983

[54] STEERING GEAR FOR A TRACK-LAYING VEHICLE

[75] Inventor: Joachim Schreiner, Gratkorn, Austria

[73] Assignee: Bombardier-Rotax Gesellschaft mbH., Vienna, Austria

[21] Appl. No.: 242,332

[22] PCT Filed: Jul. 10, 1980

[86] PCT No.: PCT/AT80/00024
§ 371 Date: Mar. 12, 1981
§ 102(e) Date: Mar. 10, 1981

[87] PCT Pub. No.: WO81/00240
PCT Pub. Date: Feb. 5, 1981

[30] Foreign Application Priority Data

Jul. 12, 1979 [AT] Austria ............................ 4856/79

[51] Int. Cl.³ ............................................. B62D 11/18
[52] U.S. Cl. ..................................................... 180/6.44
[58] Field of Search .............. 180/6.44, 6.48, 6.28, 180/6.3; 74/720.5, 687

[56] References Cited

U.S. PATENT DOCUMENTS

| | | | |
|---|---|---|---|
| 1,984,830 | 12/1934 | Higley | 180/6.44 X |
| 2,336,911 | 12/1943 | Zimmermann | 180/6.44 X |
| 2,336,912 | 12/1943 | Zimmermann | 180/6.44 X |
| 2,730,182 | 1/1956 | Sloane | 180/6.44 |
| 2,874,591 | 2/1959 | Thoma | 74/720.5 |
| 3,081,647 | 3/1963 | Blenke | 74/720.5 |
| 3,199,376 | 8/1965 | De Lalio | 74/720.5 |
| 3,373,636 | 3/1968 | Livezey et al. | 74/720.5 |
| 3,383,953 | 5/1968 | Christenson | 74/720.5 |

FOREIGN PATENT DOCUMENTS

| | | | |
|---|---|---|---|
| 1929380 | 12/1970 | Fed. Rep. of Germany | 74/720.5 |
| 1378878 | 10/1964 | France . | |
| 2284504 | 4/1976 | France . | |
| 1227311 | 4/1971 | United Kingdom . | |

*Primary Examiner*—John A. Pekar

[57] ABSTRACT

A tracklaying vehicle has an engine, a drive shaft, and right and left drive wheels. It is steered by an arrangement having right and left planetary-gear transmissions each provided with a sun gear connected to the respective wheel, a ring gear coaxially surrounding the respective sun gear and connected directly to the drive shaft, at least one planet gear meshing with the respective sun and ring gears, and a planet carrier carrying the respective planet gear. The ring gears are joined together and connected to the drive shaft. Respective independently operable right and left hydrostatic drive motors are connected to the planet carriers of the respective transmissions and can be independently operated for adding of their rotation to or subtracting it from that of the respective output.

6 Claims, 1 Drawing Figure

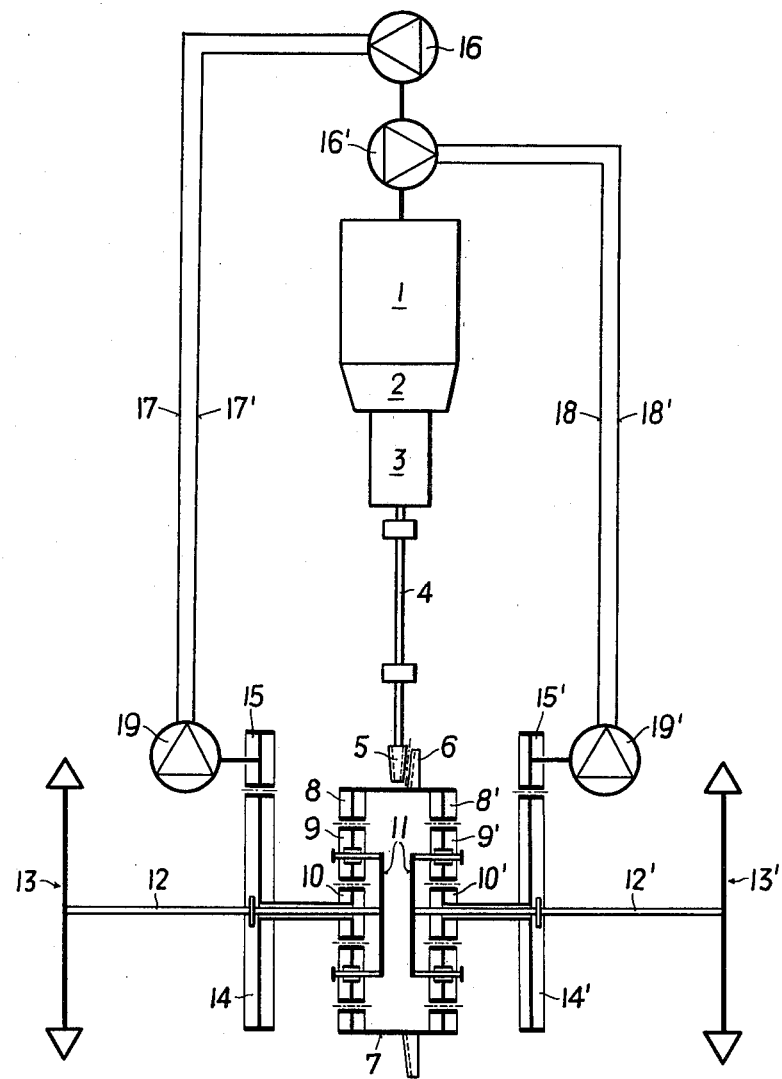

STEERING GEAR FOR A TRACK-LAYING VEHICLE

In the state of the art there are described a large number of steering gear arrangements for track-laying vehicles.

Purely mechanical solutions, by means of which the different track-laying velocities are effected, such as by means of frictional contacting members, brakes and/or couplings, are already known. Also adjustable drives, in the form of chain drives, frictional drives or cone belt drives, are known. These known drives are frequently accompanied with a poor weight-horsepower ratio, which limits the available constructional volume for the transferred power.

More modern solutions prefer recent hydrostatic drives. These have, with small constructional sizes, frequently relatively poor efficiency and when a large power is to be transmitted there occur thermal as well as constructional problems. In a known drive of this type a zero shaft acts on a planetary drive arranged in front of the chain wheels, whereby the zero shaft can be driven by the drive motor either purely mehanically but also in a known manner by means of a hydrostatic drive, whereby a control member drivingly connects, in dependency with the size of the selected turning circle diameter, the mechanical or hydrostatic drive with the zero shaft. The construction of this steering drive arrangement is complex, without furnishing any additional advantages over the other superposed connecting drive arrangements.

The invention resolves this task, by expanding the application range of such steering drives and by providing additional advantages, as for example improving the adjustability of the travel velocity. The invention indicates a solution in which the possibilities of modern technology are advantageously combined, whereby by branching the drive power a good total effect and efficiency is obtained and the velocity range of the track laying vehicle can be very large.

The invention therefore resides in a gear arrangement for track-laying vehicles, consisting of an internal combustion motor with torque converter and drive shaft, universal-joint shaft as well as a steering gear, consisting of two planetary drives, whereby each branch of the drive is connected to the internal combustion motor by means of the drive shafts as well as each branch of the planetary drive represents a secondary drive, onto which a third remaining branch of the steering drive provides the steering by means of a hydrostatic drive which is driven by the motor and is thereby characterized, that for each track-laying side there is provided a hydrostatic drive which is driven by the internal combustion engine and is directly connected with the third branch of the gear drive. It is however known, to equip each track-drive transmission with a hydrostatic drive; however, these tracks are not driven by the motor but represent a branch in the drive connection between the planetary drive (gear) and the track. With this there is only, however, employed a single track, the function of which can be accomplished by other known steering drives, to wit a rotation of the vehicle on one track about its vertical axis to steer it.

It has been found surprising, that by means of the inventor's driving of the hydrostatic gear drive arrangement directly by means of the motor and its direct connection to the third branch of the planetary gear drive the following advantages are achieved:

With an adjusted switching stage of the transportation drive (drive gear) there is achieved an additional increase or reduction of the travel velocity;

turning in place, that is on one track, reduction of the wear of the hydrostatic drive when straight starting by means of zero demand, arresting (non-operation) of the mechanical drive of the planetary gear and travelling and steering only by means of the hydrostatic drive (gear).

The sole FIGURE of the drawing is a largely schematic representation of the instant invention.

An internal combustion engine 1 serves as the power source. To its rear there is connected an automatic transmission, consisting of a torque converter 2 and a gear transmission 3 which is secured thereto by a flange. In a simplified construction there can, in lieu of the automatic transmission, be used a normal manually shiftable transmission with a coupling clutch. In such a case the conventional transmission is at its driving (output) side provided with a brake, in order to be able to block the drive shaft, which is effected in an automatic transmission by means of the "park" position thereof.

The drive shaft 4 connects the drive arrangement block back to the drive train.

The drive consists of a pinion 5, and ring wheel 6. This wheel 6 is flanged onto a drum 7. The drum 7 supports in its interior two hollow gear wheels or ring gears 8 and 8', which belong to the left, respectively right, planetary gear drive of the gear arrangement. The planetary gear wheels 9 and 9' mesh, on the one hand, with the hollow wheels 8 and 8', and on the other hand, with the sun wheels 10 and 10' and are mounted in the planetary supports 11 and 11'. The planet carriers support (carriers) 11 and 11' are connected with the drive shafts 12 and 12', at the ends of which there are schematically indicated the sprockets 13 and 13'. In practice these sprockets 13 and 13' are frequently additionally provided with a pre-drive (intermediate) gear arrangement.

The sun wheels 10 and 10' are connected with the intermediate drive gear wheels 14 and 14' which are again in meshed engagement with the intermediate gear pinions 15 and 15'.

This intermediate gear is illustrated as a spur-gear system, but can, of course, also be formed as conical wheels, a chain drive or a worm gear. What is controlling is that in the required reduction, the constructional input or also the desired degree of efficiency is obtained. When an elevated driving torque moment is desired, it is recommended to utilize a worm gear and meshing worm gear, which, as is known, provide a higher driving torque.

The supports for the steering drive arrangement have been omitted for purposes of clarity.

The left and right intermediate gear of the planetary gears drive the respective hydrostatic drives, which drives consist of pumps 16 and 16', high pressure conduits 17 and 17', 18 and 18' as well as hydraulic motors 19 and 19'.

The pumps 16 and 16' are mounted directly on the internal combustion engine 1 and are driven by the same. These pumps 16 and 16' are adjustable insofar as their rates of delivery and discharges are concerned and the direction of delivery flow of each is reversible.

The motors 19 and 19' are reversible and the speed of such motor can, with respect to their suction volume, maintained constant or can be adjusted.

The following types of drive for this gear arrangement are possible, whereby the hydrostatic drive always takes over the steering gear.

When the vehicle is driven purely hydrostatically, there is to be used in the automatic transmission the switching position "parking", or, when a manual transmission is used, the drive shaft 4 is to be arrested by means of a brake (not illustrated). With this type of drive the vehicle can be moved in a straight line forward, backward, or about its own vertical axis to steer it. The velocities of the vehicle are, depending on the construction of the hydrostatic drives, adaptable to the terrain.

When the vehicle is primarily driven by the automatic transmission, the hydrostatic drives are only required for steering.

It is, however, also possible with the aid of hydrostatic drives to add or subtract the rotation of the hydrostatic drives to or from that of the automatic transmission. In the lowest gear of the automatic transmission the hydrostatic drive can even further reduce the travel velocity of the vehicle. In the same manner, in the highest gear of the automatic transmission, the travel velocity can also be further increased. Also in the individual gears a variation is possible for both and slowing and speeding up, in addition to the normal steering functions of the hydrostatic drive.

The dimensions of the hydrostatic drive and of the automatic or conventional (manual) transmission depend on what properties the vehicle is to have.

A very simple solution of the hydrostatic drive can be effected by means of simple gear pumps and motors by means of intermediate switching by hydraulic nozzles, whereby step-less adjustability of the steering can be attained.

I claim:

1. A steering arrangement for a tracklaying vehicle having a drive shaft and right and left drive wheels, the steering arrangement comprising:
   right and left planetary-gear transmissions each having two inputs and an output, the outputs being connected to the respective drive wheels;
   means for connecting one input of each transmission to the drive shaft for joint rotation of the one inputs with the drive shaft;
   respective independently operable right and left hydrostatic drive motors connected to the other inputs of the respective transmissions; and
   hydrostatic pump means for independently powering and operating the drive motors for adding the rotation of the other inputs to that of the respective outputs.

2. The steering arrangement defined in claim 1 wherein each of the transmissions includes
   a sun gear constituting the respective output;
   a ring gear coaxially surrounding the respective sun gear and constituting the respective one input, the ring gears being joined together for joint rotation;
   at least one planet gear meshing with the respective sun and ring gears; and
   a planet carrier carrying the respective planet gear and constituting the respective other input.

3. The steering arrangement defined in claim 1 wherein the vehicle has an engine, the hydrostatic pump means being driven thereby.

4. The steering arrangment defined in claim 3 wherein the hydrostatic pump means includes respective right and left pumps and conduits connecting same to the respective motors.

5. The steering arrangement defined in claim 1, further comprising means for arresting the drive shaft.

6. A steering arrangement for a tracklaying vehicle having an engine, a drive shaft, and right and left drive wheels, the steering arrangement comprising:
   right and left planetary-gear transmissions each having a sun gear connected to the respective wheel;
   a ring gear coaxially surrounding the respective sun gear and connected directly to the drive shaft, the ring gears being joined together for joint rotation;
   at least one planet gear meshing with the respective sun and ring gears; and
   a planet carrier carrying the respective planet gear;
   respective independently operable right and left hydrostatic drive motors connected to the planet carriers of the respective transmissions; and
   hydrostatic pump means driven by the engine for independently powering and operating the drive motors for adding the rotation of the other inputs to that of the respective outputs.

* * * * *

UNITED STATES PATENT AND TRADEMARK OFFICE
CERTIFICATE OF CORRECTION

PATENT NO. : 4,393,952
DATED : July 19, 1983
INVENTOR(S) : Joachim Schreiner

It is certified that error appears in the above-identified patent and that said Letters Patent are hereby corrected as shown below:

On the title page Item [73] Assignee: should read

---Bombardier-Rotax Gesellschaft m.b.H. Zweigniederlassung Wien---

Signed and Sealed this

Sixth Day of March 1984

[SEAL]

Attest:

GERALD J. MOSSINGHOFF

Attesting Officer     Commissioner of Patents and Trademarks